United States Patent
Kummer et al.

(10) Patent No.: US 8,533,751 B2
(45) Date of Patent: *Sep. 10, 2013

(54) METHOD AND APPARATUS FOR PARENTAL CONTROL

(75) Inventors: David A. Kummer, Highlands Ranch, CO (US); Edmund F. Petruzzelli, Centennial, CO (US); Danny J. Minnick, Littleton, CO (US)

(73) Assignee: EchoStar Corporation, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/237,747

(22) Filed: Sep. 20, 2011

(65) Prior Publication Data

US 2012/0011537 A1    Jan. 12, 2012

Related U.S. Application Data

(63) Continuation of application No. 11/118,219, filed on Apr. 28, 2005, now Pat. No. 8,024,753.

(60) Provisional application No. 60/566,296, filed on Apr. 28, 2004.

(51) Int. Cl.
*H04N 7/16* (2011.01)

(52) U.S. Cl.
USPC .............. 725/28; 725/25; 725/27; 725/31

(58) Field of Classification Search
USPC ................. 725/25, 27, 28, 30, 31
See application file for complete search history.

(56) References Cited

U.S. PATENT DOCUMENTS

| | | | | | |
|---|---|---|---|---|---|
| 5,172,111 | A | * | 12/1992 | Olivo, Jr. | 386/239 |
| 5,382,983 | A | * | 1/1995 | Kwoh et al. | 348/716 |
| 5,684,918 | A | | 11/1997 | Abecassis | |
| 5,828,402 | A | * | 10/1998 | Collings | 725/28 |
| 5,949,471 | A | * | 9/1999 | Yuen et al. | 725/27 |
| 5,969,748 | A | * | 10/1999 | Casement et al. | 725/27 |
| 5,973,683 | A | * | 10/1999 | Cragun et al. | 715/719 |
| 6,216,263 | B1 | * | 4/2001 | Elam | 725/28 |
| 6,504,990 | B1 | * | 1/2003 | Abecassis | 386/283 |
| 6,701,523 | B1 | * | 3/2004 | Hancock et al. | 725/25 |
| 6,839,090 | B1 | * | 1/2005 | Yokota | 348/460 |
| 6,922,843 | B1 | * | 7/2005 | Herrington et al. | 725/30 |
| 7,421,729 | B2 | * | 9/2008 | Zenoni | 725/146 |
| 7,657,904 | B2 | * | 2/2010 | Katayama | 725/28 |
| 8,024,753 | B1 | | 9/2011 | Kummer et al. | |
| 2004/0006767 | A1 | * | 1/2004 | Robson et al. | 725/28 |
| 2005/0251827 | A1 | * | 11/2005 | Ellis et al. | 725/47 |

OTHER PUBLICATIONS

U.S. Appl. No. 60/076,290, filed Feb. 27, 1998, incolrporated by reference into US 6,701,523.

* cited by examiner

*Primary Examiner* — Pankaj Kumar
*Assistant Examiner* — Timothy Newlin
(74) *Attorney, Agent, or Firm* — Ingrassia Fisher & Lorenz, P.C.

(57) ABSTRACT

Television converter devices in accordance with present invention determine whether the programming is to be blocked or not, then inserts an appropriate V-code into the vertical blanking interval (VBI) of the programming before delivering the programming to one or more V-chip enabled TV where the V-chip blocks the programming as appropriate. Various methods of determining whether the programming is to be blocked are disclosed.

20 Claims, 8 Drawing Sheets

| PCS Code | Description | Corresponding V-Code |
|---|---|---|
| ⋮ | ⋮ | ⋮ |
| A | Coarse Language | TV-PG |
| B | Limited Violence | TV-PG |
| C | Suggestive Sexual Dialog | TV-PG |
| D | Suggestive sexual Situations | TV-PG |
| E | Strong Language | TV-14 |
| F | Moderately Intense Violence | TV-14 |
| G | Sexual Dialog | TV-14 |
| H | Sexual Situations | TV-14 |
| ⋮ | ⋮ | ⋮ |

FIG. 5a

| PCS Code | Description | Corresponding V-Code |
|---|---|---|
| A | Coarse Language | TV-PG |
| B | Limited Violence | TV-PG |
| C | Suggestive Sexual Dialog | TV-MA |
| D | Suggestive sexual Situations | TV-MA |
| E | Strong Language | TV-14 |
| F | Moderately Intense Violence | TV-14 |
| G | Sexual Dialog | TV-MA |
| H | Sexual Situations | TV-MA |

FIG. 5b

METHOD AND APPARATUS FOR PARENTAL CONTROL

RELATED APPLICATIONS

This application is a continuation of U.S. patent application Ser. No. 11/118,219, titled METHOD AND APPARATUS FOR PARENTAL CONTROL filed Apr. 28, 2005, which application claims priority to United States Provisional Application Ser. No. 60/566,296, titled METHOD AND APPARATUS FOR PARENTAL CONTROL filed Apr. 28, 2004, both of which are hereby incorporated by reference herein in their entireties.

FIELD OF THE INVENTION

The present invention relates to a method of controlling the display of television programming. More particularly, the invention relates to a method for independently blocking selected programming to one or more televisions connected to a television converter device at a subscriber location.

BACKGROUND OF THE INVENTION

Parental controls are used to limit access to content, such as violent or adult-themed programming. Typically, parents use parental controls to limit access of their children to programming which the parents have decided are inappropriate. Today, most televisions and television converter devices used in entertainment systems are equipped with some form of parental control. In addition to government mandated V-chip method, many subscriber-based content providers, such as cable television and satellite television providers, include their own parental control means as features within the television converter devices or other equipment that they provide to subscribers. However, the current means for instituting parental controls, be they V-chip based or part of a subscriber-based content provider system, are inadequate because of advances in television technology and inherent limitations in the current parental control technology.

Probably the most common parental control means is known as the V-chip method. A V-chip is a device that is now standard in TV sets sold in the United States. As of 1999, all new television sets (over 13 inches/33 cm) sold in the United States must contain a V-chip. The "V" stands for "violence," and the goal of the chip is to allow parents to choose the level of violent TV programming that will be allowed into the home. The V-chip samples data contained in the vertical blanking interval (VBI), also know as the line 21 data area, of a standard television signal pertaining to the nature of that program in which they are embedded. These data, known as V-codes, are used by the V-chip to determine whether to show the programming on television or not. The V-chip samples the V-code and compares it to a pre-selected blocking level. If the rating of the programming exceeds the preset blocking level, the V-chip does not allow the TV to display the programming (i.e. it is blocked). Parents use an access code, which presumably only they know, to select from an on-screen menu a blocking level that they deem appropriate for the TV's user.

The V-chip method for parental control has become popular because of its ubiquitous nature. However users are limited to the V-chip system of classifying content. The V-chip system uses a rating system loosely based on the Motion Picture Association of America (MPAA) rating system to classify television programming, using such codes as TV-Y, TV-Y7, TV-G, TV-PG, TV-14, and TV-MA (see Table 1) to classify all television programming. In essence, these are the blocking levels available. Because these relatively broad classifications are being used to classify the entire spectrum of television programming, users are often unable to lock out certain specific programs, or even types of programming, without locking out other programming which they do not find offensive, but which happen to share the same rating. This is a problem with the current V-chip method.

TABLE 1

| V-Chip Ratings and Descriptions | |
|---|---|
| TV-Y | All Children - This program is designed to be appropriate for all children. The themes and elements in this program are specifically designed for a very young audience, including children from ages 2-6. |
| TV-Y7 | Directed to Older Children - This program is designed for children age 7 and above. It may be more appropriate for children who have acquired the developmental skills needed to distinguish between make-believe and reality. Themes and elements in this program may include mild physical or comedic violence. |
| TV-G | General Audience - Most parents would find this program suitable for all ages. Although this rating does not signify a program designed specifically for children, most parents may let younger children watch this program unattended. It contains little or no violence, no strong language and little or no sexual dialogue or situations. |
| TV-PG | Parental Guidance - This program may contain some material that some parents would find unsuitable for younger children. The program may contain infrequent coarse language, limited violence, some suggestive sexual dialogue and/or situations. |
| TV-14 | Parents Strongly Cautioned - This program is specifically designed to be viewed by adults and therefore may be unsuitable for children under 14. This program may contain sophisticated themes, sexual content, strong language and more intense violence. |
| TV-MA | Mature Audience Only - This program is specifically designed to be viewed by adults and therefore may be unsuitable for children under 17. This program may contain mature themes, profane language, graphic violence and explicit sexual content. |

Subscriber-based satellite and cable television providers (programming distributors) typically give subscribers much more control and flexibility in blocking programming. This is achieved through the use of a more complex and often proprietary programming classification system (PCS). Often, a PCS includes a more detailed classifications scheme than the MPAA rating system. A PCS typically includes multiple PCS codes associated with the classifications that programming distributors. These PCS codes can be embedded in the television programming by the programming distributors at their head-end facility, may be included in a separate channel of the programming stream (such as in the electronic program guide, or EPG, data), or may be otherwise provided to the subscriber, such as via a telephone connection. In addition to the PCS, it is also common for programming distributors to allow users to block specific programs, for example by selecting them from the EPG.

Programming distributors normally implement such parental control methods via the television converter devices that they provide to their subscribers. Typically, a television converter device is required for each TV that the subscriber wished to view subscription television programming on. Television converter devices, thus, are designed to be collocated with a TV. Hence the name "television converter device." Subscribers can access the parental control menu via a password and select specific programming and/or programming classifications from the PCS to be blocked. Similar to the V-chip method, the television converter device stores this information and constantly compares it with the information in programming to be displayed, blocking that programming that the subscriber has selected. The control and flexibility that these methods allow have been well-received by consumers and have become selling points for programming distributors.

Subscribers typically use parent controls on a TV-by-TV basis, i.e. the television programming they deem appropriate for one TV, say in the master bedroom, may not be appropriate for another TV, say the family room where children watch TV unattended. TV-by-TV control is easily implemented using either a V-chip method or the typical PCS method wherein an television converter device is necessary for each TV.

However, a recent trend in television converter device design is for programming distributors to provide their subscribers with one piece of equipment that can provide programming to multiple TVs at the subscriber's location. Such a television converter device is intended to be collocated with one TV (a primary TV), for example a central TV in a family room, but may be connected to one or more other TVs (secondary TVs), for example in the master bedroom, basement, and children's bedrooms. The typical television converter device outputs the same channel of television programming to all connected TVs, but can be controlled via remote controllers from any connected TV. Parents with such a television converter device can then use it to view programming on a secondary TV after the kids have gone to bed or whenever the primary TV is not in use. This innovation of providing one centralized television converter device per subscriber location, as opposed to one television converter device per subscriber TV, has created a problem with respect to the typical PCS method of blocking programming.

Now that the television converter device supports multiple TVs, there is a need to allow television converter device users to block programming to some TVs but not to others. For example, a means to allow violent movies to be displayed a secondary TV in the master bedroom, but not be displayed on the primary TV in the family room. In addition, such a novel parental control means should provide the same flexibility and control consumers have become used to. Furthermore, as it has become common for television converter devices and television converter devices to also store programming for later playback, a parental control means should also work for displaying stored programming. Lastly, such a parental control means should still be simple to use and inexpensive for the programming distributors to include in the television converter device.

SUMMARY OF THE INVENTION

The present invention solves these and other problems by combining the use of the V-chip technology now available in all TVs with the flexibility and control of a PCS in a television converter device. The television converter device of the present invention allows users to block programming based on PCS codes sent by the programming distributor. However, the television converter device does not actually block the programming based on the blocking level chosen by the user. Once the television converter device determines whether the programming is to be blocked or not it then inserts an appropriate V-code into the VBI of the programming before delivering it to the V-chip enabled TV where the V-chip blocks the programming as appropriate. This retains all control and flexibility that had previously been available to subscribers because of the PCS. Thus, while multiple TVs are connected to the television converter device, only those V-chip-equipped TVs with the appropriate V-chip blocking level will be able to display programming delivered by the television converter device.

The combined V-chip/PCS method described above has many advantages when used by a television converter device. It is fast. The television converter device's only job is to sample the PCS, compare it against the current blocking level and insert either a blocked V-code or a viewable V-code in the programming. It requires essentially the same internal processing power as current PCS enabled television converter devices, so it is of similar cost. It allows the V-chip system to be used in tandem with the PCS. Thus, the V-chip is still available to block over-the-air broadcast programming without interfering with the operation of the PCS. In this way, a single television converter device can serve multiple V-chip-equipped TVs each which can have a different blocking level.

The combined V-chip/PCS method is also suitable for providing parental control over viewing of programming stored on the television converter device. In an embodiment, recorded television programming is stored with its original PCS information. When playback is requested, the television converter device samples the PCS of the stored programming and inserts an appropriate V-code. In an alternative embodiment, the television converter device, while recording the programming, stores an appropriate V-code in the programming.

BRIEF DESCRIPTION OF THE DRAWINGS

FIG. 5a presents a portion of a table showing PCS codes, a brief description of the content indicative of the PCS codes and the V-codes that correspond to the PCS Codes.

FIG. 5b presents the same portion of the table in FIG. 5a after it has been edited by a user to further restrict the display of television programming containing sexual themes.

DETAILED DESCRIPTION OF THE PREFERRED EMBODIMENTS

Figure 1A:
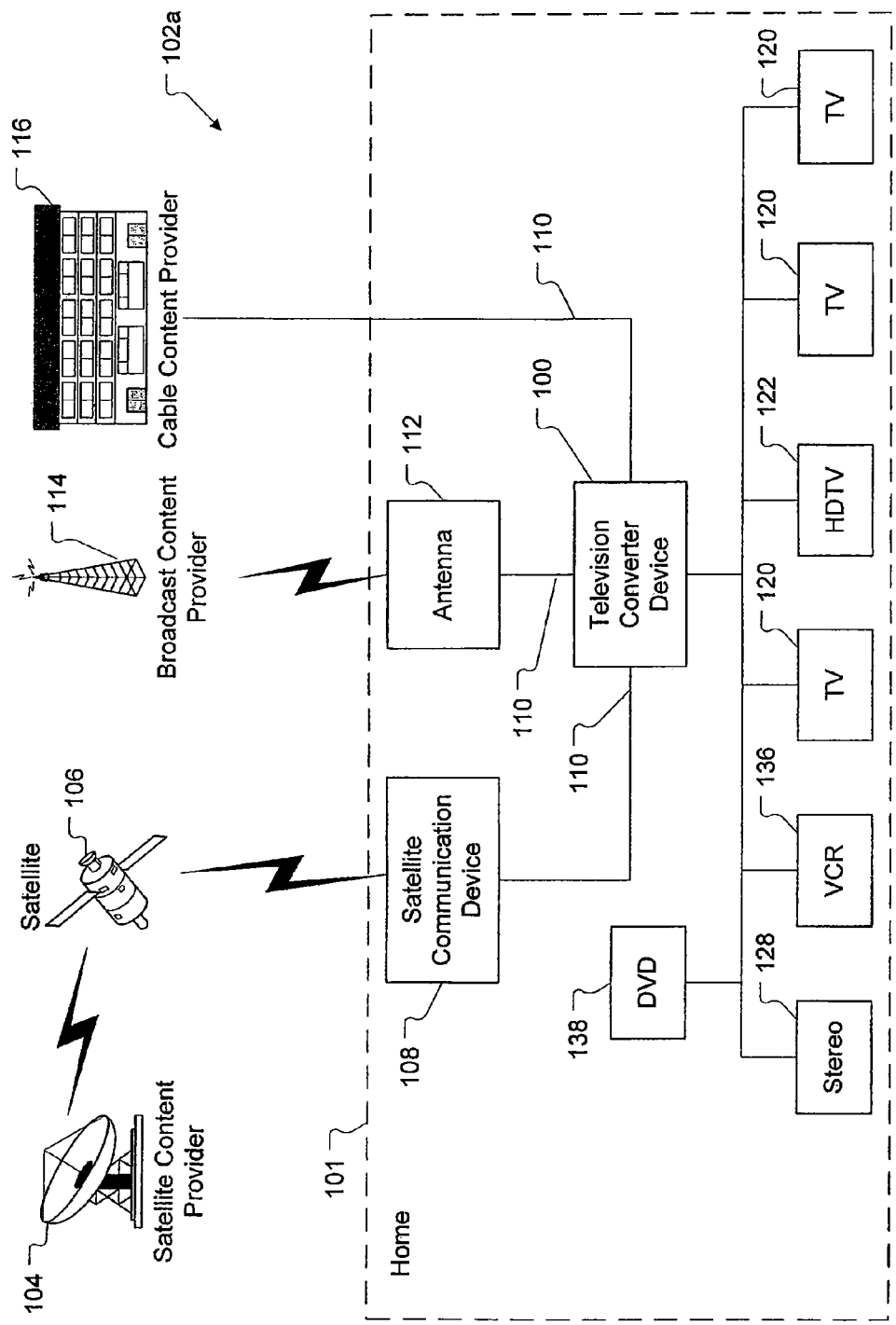
FIG. 1a illustrates an entertainment system utilizing a television converter device in accordance with an embodiment of the present invention.

In this specification, the present invention will be described using methods and systems related to subscriber satellite television service. This specific description is not meant to limit the invention to that one embodiment. The present invention may also be applicable to cable television systems, broadcast television systems or other television systems. The present invention is also described in terms of digital video recorder (DVR) devices. The present invention may also be applicable to digital-versatile-disc (DVD) recording devices or other television recording devices. One skilled in the art will recognize that the present invention can apply elsewhere. While the invention has been particularly shown and described with reference to preferred embodiments thereof, it will be understood by those skilled in the art that various other changes in the form and details may be made therein without departing from the spirit and scope of the invention.

As a general matter, the disclosure uses the term "signal." One skilled in the art will recognize that the signal may be any digital or analog signal. Those signals may include, but are not limited to, a bit, a specified set of bits, an A/C signal, or a D/C signal. Uses of the term "signal" in the description may include any of these different interpretations. It will also be understood to one skilled in the art that the term "connected" is not limited to a physical connection but can refer to any means of communicatively or operatively coupling two devices.

As another general matter, the disclosure uses the terms "television converter," "receiver," "set-top-box," "television receiving device," "television receiver," "television recording device," "satellite set-top-box," "satellite receiver," "cable set-top-box," "cable receiver," and "television tuner" to refer interchangeably to a converter device or electronic equipment that has the capacity to acquire, process and distribute one or more television signals transmitted by broadcast, cable, telephone or satellite distributors. DVR and "personal video recorder (PVR)" refer interchangeably to devices that can record and play back television signals and that may implement trick functions including, but not limited to, fast-forward, rewind and pause. As set forth in this specification and the figures pertaining thereto, DVR and PVR functionality or devices may be combined with a television converter. The signals transmitted by these broadcast, cable, telephone or satellite distributors may include, individually or in any combination, internet, radio, television or telephonic data or information. One skilled in the art will recognize that a television converter device may be implemented as an external self-enclosed unit, a plurality of external self-enclosed units or as an internal unit housed within a television. One skilled in the art will recognize that the present invention can apply to analog and digital satellite set-top-boxes.

As yet another general matter, it will be understood by one skilled in the art that the term "television" refers to a television set or video display that may contain an integrated television converter device (e.g., an internal cable-ready television tuner housed inside a television) or, alternatively, that is connected to an external television converter device (e.g., an external set-top-box connected via cabling to a television). A further example of an external television converter device is the EchoStar Dish PVR 721, Part Number 106525, combination satellite set-top-box and DVR.

Finally, as a general matter, it should be understood that satellite television signals may be very different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO™, CSPAN™, ABC™, CBS™, or ESPN™. In satellite television, a service provider can also be compared to a "channel."

The term "channel," as used in this description, carries a different meaning from its normal connotation. In broadcast television, different analog signals of a television station may be carried on a carrier frequency and its sub-channels. A tuner in a television may then acquire and process these signals. In broadcast television, the term channel has thus become synonymous with the sub-channel or the station on that sub-channel. The normal connotation of the term "channel" is therefore not always appropriate to describe satellite television transmissions where multiple stations may be multiplexed onto a single carrier frequency. Satellite television distributors, however, may organize the satellite data into a group of different "virtual channels." These virtual channels give the impression that the satellite television programs (the service providers) are placed in channels. This impression may assist user operation of the satellite set-top-box since it models an analog television or analog receiving device. The virtual channels may appear in the electronic program guide (EPG) data and the user may choose programming by selecting a virtual channel. For instance, the user can select HBO, which may be on virtual channel 300, or CSPAN, which may be on virtual channel 210. These service providers or virtual channels are not necessarily carried in the same signal being sent from the same satellite. EPG data may come from a service provider (e.g., HBO), content provider (e.g., Disney), a third party (e.g., TV Guide) or from another outside entity. Thus, in satellite television service a channel may not be the same as in broadcast television service. Rather, channels may be more properly termed service providers in satellite television service. The term "channel" will be used in this description to describe the service providers and the virtual channels they may occupy.

Turning now to the Drawings, wherein like numbers denote like parts throughout the several views, FIG. 1a illustrates a subscriber's entertainment system 101, and the general environment 102a of the subscriber's location within which it operates, in accordance with an embodiment of the present invention. As illustrated in FIG. 1a, an entertainment system 101 comprises a centralized television converter device 100 that receives and distributes signals from one or more television programming distributors. FIG. 1a shows a generalized embodiment where the television converter device 100 may receive a signal 110 comprising multiple channels of television programming from a wireless content provider 114 (via a connected antenna 112), from a wired or cable content provider 116 (via a direct connection), and from a satellite content provider 104 (via a satellite 106 and a satellite communication device or antenna 108). Other embodiments are possible. For example, in one embodiment, the television converter device 100 may only receive and distribute signals from a cable content provider 116. In a preferred embodiment, the television converter device 100 is connected to and can receive signals from a satellite communications device 108, such as a home satellite dish, that is capable of recognizing and receiving transmitted signals from the satellite 106. The satellite 106 may be any type of satellite, for example a direct broadcast signal (DBS) satellite, designed to transmit signals containing television programming and other content such as music, audio, and internet content.

The television converter device 100, as illustrated in FIG. 1a, can be connected to several V-chip-equipped display devices for the delivery of content to the user. In this application, the term display device is used to indicate any device connected to the television converter device 100 that primarily delivers content directly to the user and is equipped with a V-chip. These include multiple traditional TVs 120, high definition TVs (HDTVs) 122, computer/monitor combinations (not shown) if used for the display of content delivered to it by the television converter device 100, simple monitors (not shown) adapted to receive signals directly from the television converter device 100, and a stereo 128. Furthermore, it is contemplated that the television converter device is collocated with a primary display device, while the balance of the multiple display devices (the secondary display devices) are distributed in various rooms throughout the subscriber's location 101. It should also be noted that by stereo 128 this application refers to any type of primarily audio-only delivery system and includes devices as simple as a speaker or headphones connected to the television converter device 100 through devices as complex as digital surround sound home theater systems and whole-house audio systems.

Although only one is specifically shown, the television converter device 100 may also be connected to several peripheral components (peripherals). Examples of peripherals include interactive content devices such as a telephone 130, content capture devices such as a video camera 132 or microphone (not shown), external data storage and playback devices 134 such as a VCR 136 and DVD player 138, and multipurpose devices such as the computer/monitor 124 and further includes a home local area network (LAN) 140 of such devices.

Another peripheral commonly included in a entertainment system 101 is one or more remote controllers (not shown). While most peripherals are typically, but not necessarily, physically connected to the television converter device 100 or other components by wire, remote controllers are typically connected to the television converter device 100 by an RF, IR or some other non-physical connection. For example, the EchoStar Technologies Corporation 1.5 Remote, model 123479171-AA has a pair of transmitters, an IR transmitter and an ultra high frequency (UHF) transmitter, that are used to send commands to a television converter device 100.

The embodiment shown in FIG. 1a also includes a connection to a standard telephone line 130 at the subscriber's location. The telephone connection may be used to deliver software to the television converter device (in addition to delivering software via the signal 110) and to report the ordering of pay-per-view television programming from the television converter device. The use of a single television converter device to support all the TVs at a subscriber location eliminates the need to provide telephone line connects to each TV location.

Figure 1B:
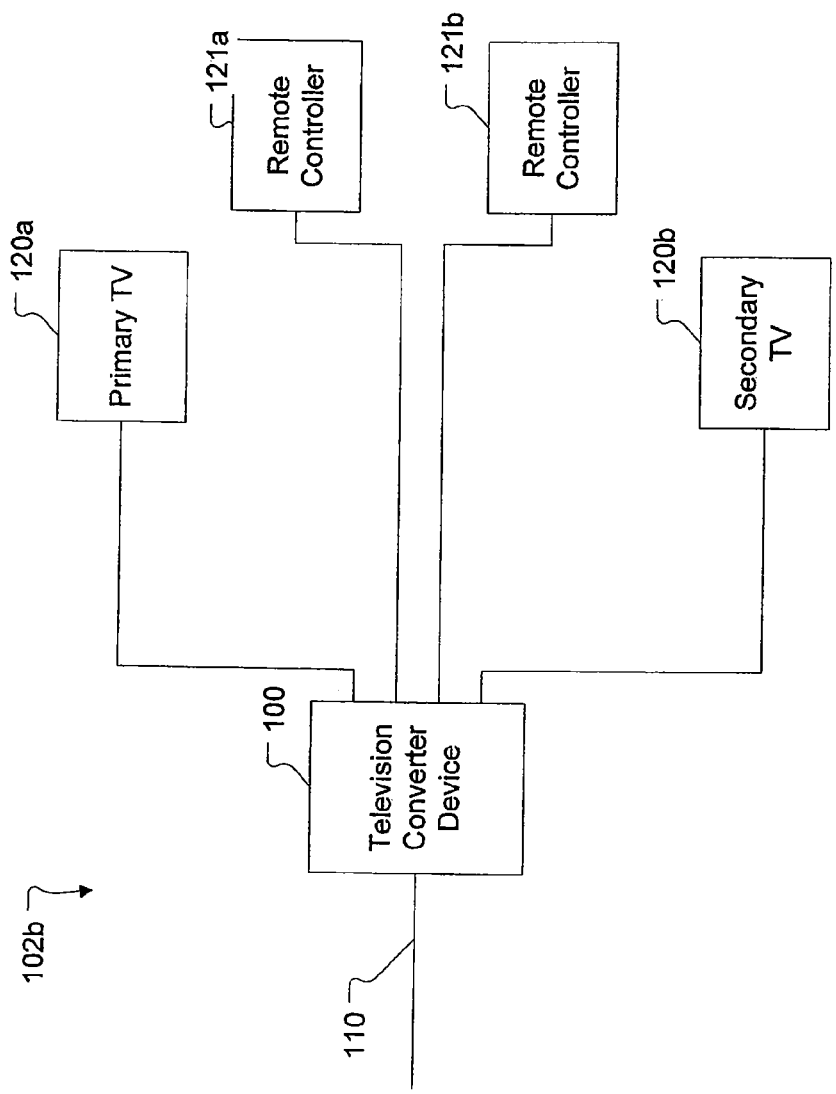
FIG. 1b illustrates a simplified entertainment system comprising a television converter device connected to two TVs.

FIG. 1b shows a more specific environment 102b wherein a television converter device 100 in accordance with the present invention is used to deliver television programming to two attached TVs 120a, 120b. The television converter device 100 receives a signal 110 containing multiple channels of television programming from a programming distributor. In this embodiment, the television converter device 100 is able to select channels of programming from the signal 110 and then deliver the selected channels to the two attached TVs 120a, 120b. In embodiments of the television converter device with internal or external storage capability, the user may also view programming that is stored on the television converter device's internal or external storage device, if any. The television converter device 100 is intended to be collocated with the primary TV 120a while also being connected to the secondary TV 120b that is located in another room. In alternative embodiments the television converter device may be connected to more than one secondary TV 120b.

Also shown in FIG. 1b are a primary remote controller 121a and a secondary remote controller 121b. The remote controllers 121a, 121b are a means for user control of the television converter device 100. In addition, the television converter device 100 may also be equipped with an integral user keypad. In most embodiments, at least one primary remote controller 121a and one secondary remote controller 121b are provided. In alternative embodiments, one secondary remote controller is provided for each secondary TV 120b. As noted before, it is typical for remote controllers to include IR or UHF transmitters for wireless communication with the television converter device 100. Because it is assumed that in any particular instance only the primary TV 120a is collocated with the television converter device 100, in one embodiment UHF transmitters are used in all secondary remote controllers 121b for use with secondary TVs 120b. This is because UHF signals can easily penetrate walls of a typical home and communicate with a remote television converter device 100, whereas IR signals cannot. In another embodiment, a UHF and IR transmitters are included in all remote controllers 121a, 121b, thus allowing any remote controller to be used from any location. Other means of connecting remote controllers to a device such as a television converter device 100 that is in a different room are well known in the art, e.g. providing for each remote TV 120b an IR sensor that is connected in some fashion to the television converter device 100, and need not be described here.

In the embodiment shown in FIG. 1a and FIG. 1b, the television converter device 100 is implemented as a stand-alone device. One skilled in the art will recognize that it may be implemented in any number of ways and need not be a stand-alone device proximate to a TV within the subscriber's location as discussed in FIG. 1b. For example, another embodiment of the present invention is a television converter device 100 designed to be located in a basement or some other central point at the subscriber's location that allows convenient connection to various devices in other rooms at the location. As another example, embodiments of the present invention may be implemented as part of a central home theater device that includes a display device and stereo sound system. A further example would be a home digital video storage library device, such as a DVD player with large capacity, large storage device, or a portal device to a remote video library. Such a library device would utilize the present invention to allow all the TVs at the subscriber's location to independently access television programming stored on or transmitted through the library device.

Furthermore, one skilled in the art will recognize that there are many different electronic means for implementing the television converter device 100, regardless of the component, device or location of it. Such means include software means comprising television converter device software that can be executed at need on a processor within a component comprising the necessary hardware elements, firmware means wherein a fixed set of commands to be executed by a processor is embedded with the control circuitry of a component, hardware means wherein the television converter device is expressed as fixed circuits that perform the functions when operated, or some combination of software, firmware and hardware means.

Figure 2:
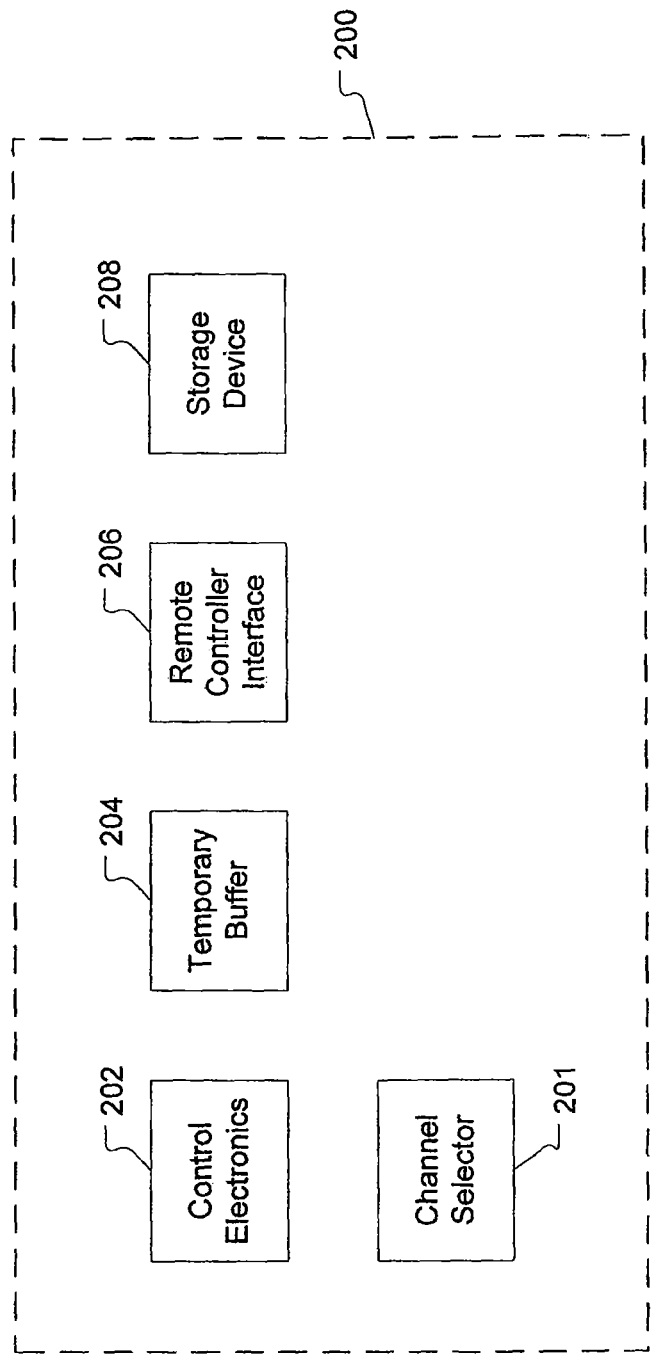
FIG. 2 is a functional block diagram of the logical elements of an embodiment of a television converter device in accordance with the present invention.

FIG. 2 illustrates some of the logical elements included in a television converter device 200 in accordance with the present invention. FIG. 2 illustrates an embodiment of the television converter device 200 that contains a channel selector 201. The term channel selector is used to describe an element that can select a television programming stream, commonly referred as a channel, from an input signal containing multiple channels of television programming and deliver the selected channel to an attached TV. In traditional analog devices, the channel selector is referred to as a tuner and a channel corresponds to a frequency on which an analog television programming stream is modulated. However, with the advent of digital signal transmission, channel selectors can be very different and significantly more complicated than simple analog frequency tuners. Thus, the term channel selector is used herein to avoid confusion and remind the reader that the invention applies equally to analog signals and digitally transmitted signals.

FIG. 2 shows the television converter device 200 also contains a storage device 208. The storage device 208 is capable of recording and storing programming provided by any of the channel selectors 200. Furthermore, the storage device 208 is further adapted to retrieve stored programming and deliver it to any TV connected to the television converter device 200. In embodiments, the television converter device 200 may also include a least one temporary buffer 204. This buffer may comprise RAM or may simply be a portion of the storage device 208. The buffer 204 is used to assist in the delivery of programming to the storage device 208 and, in some embodiments, to the connected TVs.

The television converter device 200 also contains control electronics 202 that control the operation of the channel selector 201 and the other logical elements contained in the television converter device 200. One skilled in the art will realize that such control electronics 202 can take many forms, including a combination of hardware, software and firmware, while still providing the functionality described herein. For example, in one embodiment the control electronics 202 comprise a general purpose processor running software stored on memory. In another embodiment, the control electronics 202 comprise specially designed firmware.

Figure 3:
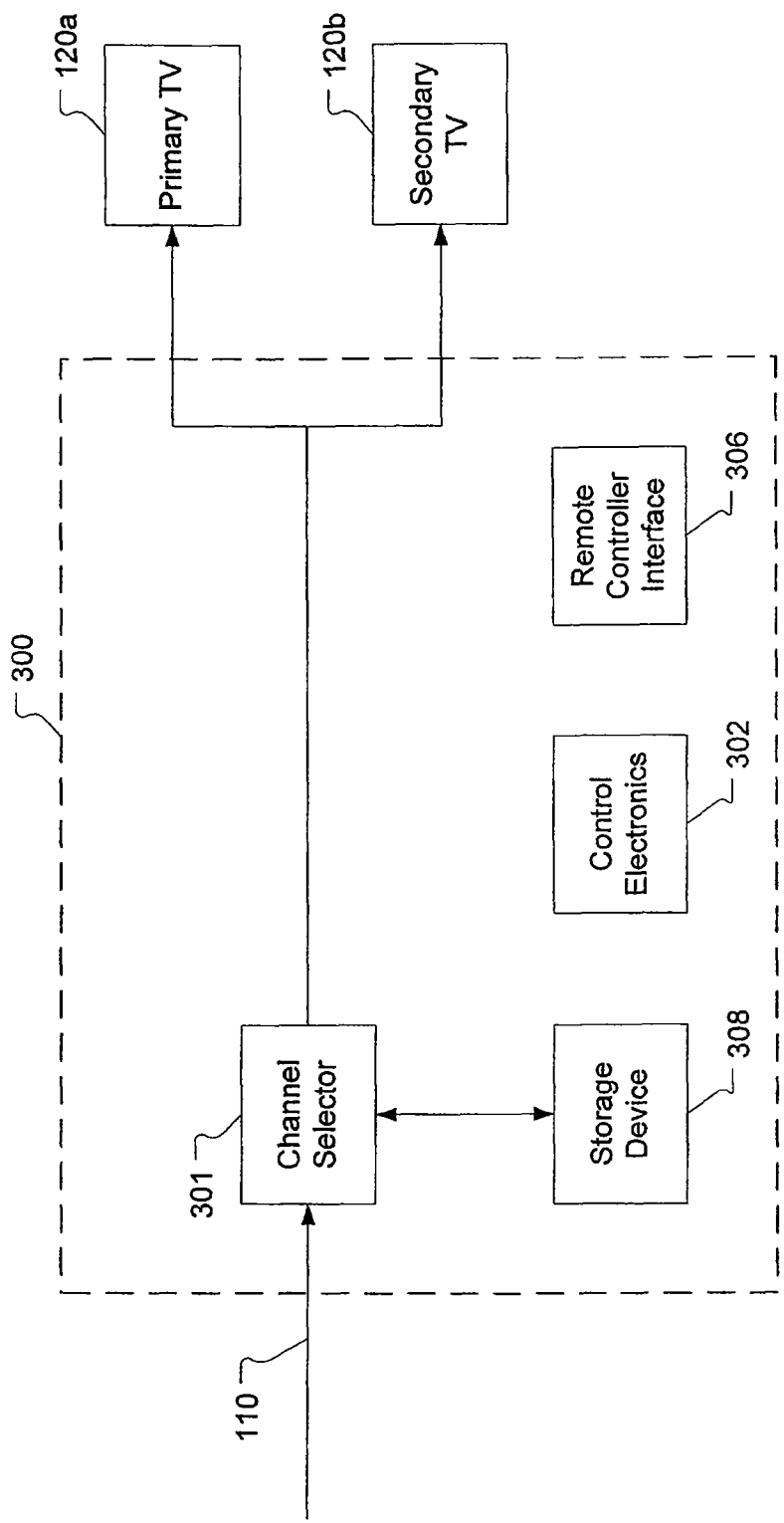
FIG. 3 illustrates the interconnectivity of logical elements of a television converter device in accordance with one embodiment of the present invention.

Moving now to FIG. 3, the interconnectivity of logical elements within a television converter device 300 in accordance with another embodiment is illustrated. While FIG. 3 shows an embodiment with one channel selector, it should be understood that any number of channel selectors 201 may be used in the television converter device 300 and still be within the scope of the present invention. While the embodiment shown in FIG. 3 does not show a separate temporary buffer, it should not be assumed that there is no buffer, only that any buffering capacity necessary is included with other elements. The channel selector 301 in the television converter device 300 is connected to the incoming signal 110 of multiple channels of television programming. In this embodiment, the channel selector selects a channel and delivers television programming on that channel as a digital data stream which can be carried the storage device and the connected TVs 121a, 121b as directed by the control electronics 302.

In an alternative embodiment, an internal data bus 302 interconnects the channel selector 201, the storage device 208, the temporary buffer 204, and the connected televisions 120. In this embodiment, the channel selectors deliver the programming as a digital data stream which can be carried on the data bus or similar connections to any attached device as directed by the control electronics 202.

In the embodiment shown in FIG. 3, one or more the following methods of the present invention are performed by the control electronics 302. In another embodiment (not shown), the methods may performed by a completely separate logic circuit which may then be considered a separate logical element.

Figure 4:
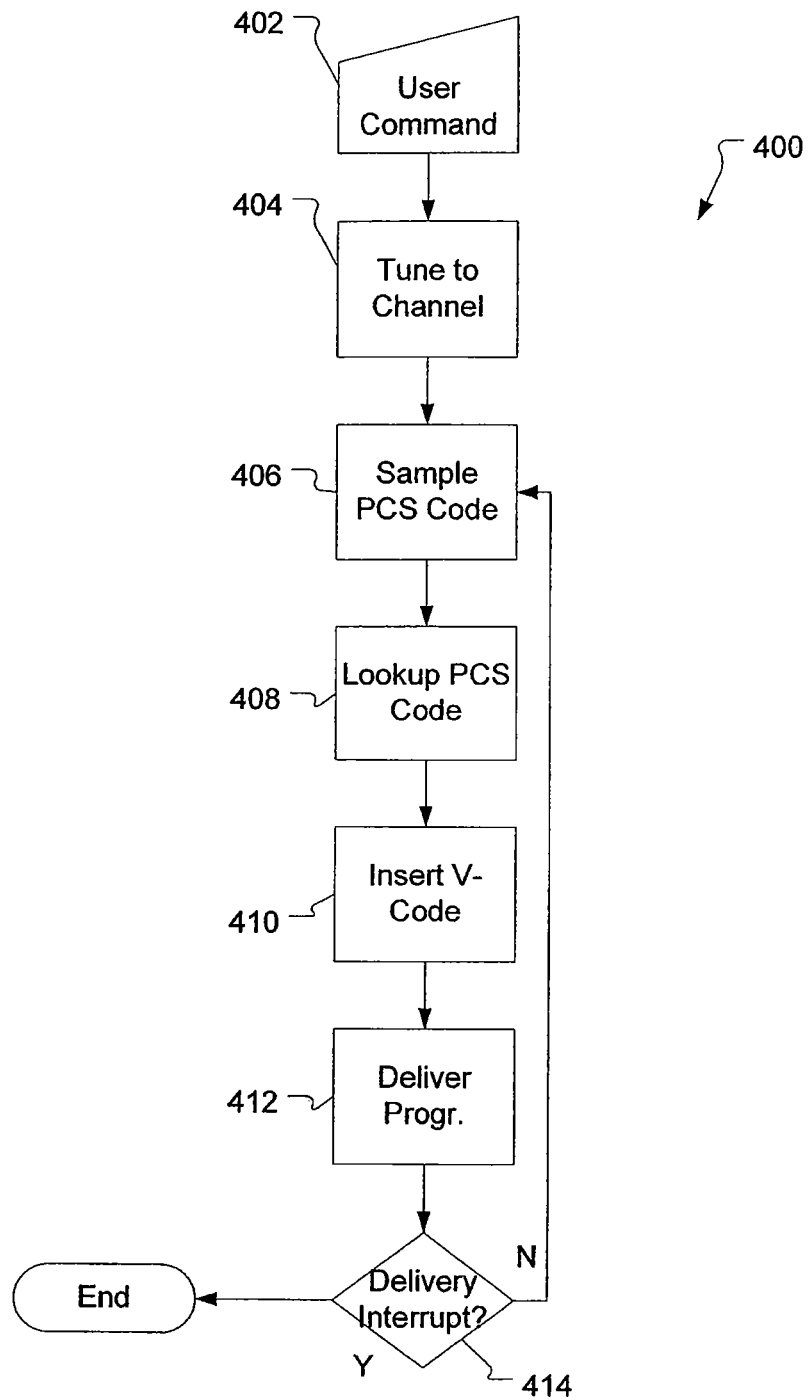
FIG. 4 illustrates the logical steps of one embodiment of a method of inserting a blocking code into television programming by a television converter device.

Turning now to FIG. 4, the logical steps of an embodiment of a general method 400 of inserting a blocking code into television programming by a television converter device based a first code embedded in a separate channel. In the embodiment shown, the first code is a PCS code embedded by a programming distributor into EPG data at the head end. The method 400 begins when the television converter device receives a manual input in the user command step 402 to deliver a specified channel of television programming to an attached TV. Examples of commands are a 'change channel' command (i.e. a command to display a different channel of television programming on a specific TV), a 'play stored programming' command, and a picture-within-picture (PIP) display command (to display a second channel of programming as a PIP display over a first channel that is already being displayed on a TV).

Upon receiving the user command, a channel selection step 404 uses a channel selector to select the channel specified in the user command step 402. After the channel has been selected in the selection step 404, a sampling step 406 samples or otherwise obtains the first code.

Next, the first code is compared to a lookup table to determine its corresponding V-code in the lookup step 408. In the embodiment, the PCS provides more classifications than the MPAA rating system. A lookup table, that may or may not be editable by the user, is stored on the television converter device that identifies each PCS code with a specific V-code.

Based on the results of the lookup step 408, the corresponding V-code will be inserted into the television programming by the insertion step 410. The insertion of the V-code may or may not require the removal of other information contained in the VBI. For example, in another embodiment wherein the first code is embedded in the VBI of the television programming, the first code is replaced by the V-code inserted by the insertion step 410.

After the V-code is inserted into the television programming by the insertion step 410, the television programming is delivered to the connected TVs by the delivery step 412. Delivery of the television programming to the connected TVs occurs regardless of the V-code inserted or the results of the lookup step 408.

The sampling step 406, lookup step 408, insertion step 410 and delivering step 412 represent steps within a continuous data delivery process. In the embodiment, the sampling step samples the first code in the EPG at a specific interval, in this case at the beginning of every minute. Different intervals are possible and within the scope of this invention, as also is tying the sampling of the first code to additional information contained in the EPG, such as the time remaining in the current program. For example, the sampling step 406 may be performed at the initial channel change and not repeated until the scheduled end of the program (as determined from the EPG data). In another embodiment wherein the first code is embedded in the VBI of the television programming, the sampling step 406 may sample the first code contained within each VBI as it is received by the television converter device. Alternatively, the sampling step 406 may only sample some subset of VBIs, e.g. every tenth VBI, as the television converter device manufacturer deems appropriate. In any event, the method 400 continuously repeats the steps so that when the nature of the television programming changes, as reflected by a change in the first code, the inserted V-code is also changed.

The method 400 only inserts a V-code into the television programming delivered to the connected TVs. The V-chip on each of the connected TVs then will either permit or block display of the television programming depending on the blocking level selected. Thus, if the primary TV has a blocking level of TV-G, it will block display of television programming with an inserted V-code equal to more restrictive than TV-G, while a secondary TV with a different blocking level may display the same programming.

The delivery interrupt step 414 illustrates the repeating of the method 400. The delivery interrupt step 414 causes the sampling step 406, comparing step 408, insertion step 410 and delivering step 412 to be repeated until the delivery is interrupted. The delivery may be interrupted by a user command or some other event that requires the television converter device to cease delivery of the specified television programming to the connected TVs. The method 400 ends when the delivery is ceased.

An example of a portion of one embodiment of a lookup table is presented in FIG. 5a. The lookup table 500 of FIG. 5a contains a list (as one column of the table 500) of first codes 502, the description of the content of television programming described by the first code 504 (as a second column), and the V-code 506 corresponding to the first code 502. In the embodiment shown, the first codes are PCS codes. It will be understood to one skilled in the art that the PCS code need not be a single character and can take any number of forms, and the exact form is not important as long as the code can be recognized by the television converter device. Likewise, it will also be understood that the actual form of the lookup table 500 may be very different from that presented in FIG. 5a and the exact form is not important as long as the television converter device can determine a corresponding V-code for the PCS codes. The creation and use of lookup tables is well known in the art and a discussion of the forms and methods associated with them is not necessary here.

Some embodiments allow the user to edit the lookup table to tailor the blocking of television programming to his desires. Such an embodiment is shown in FIG. 5b, wherein the same portion of the lookup table as shown in FIG. 5a is presented after a user has edited it to more greatly restrict the display of sexually-themed television programming. The user has decided to treat all sexual television programming 508 as for mature audiences by changing the V-code 510 corresponding to first codes 512 having sexual content to be TV-MA. For violence and language, however, the user has chosen to follow the MPAA V-code ratings normally corresponding to those descriptions.

Figure 6:
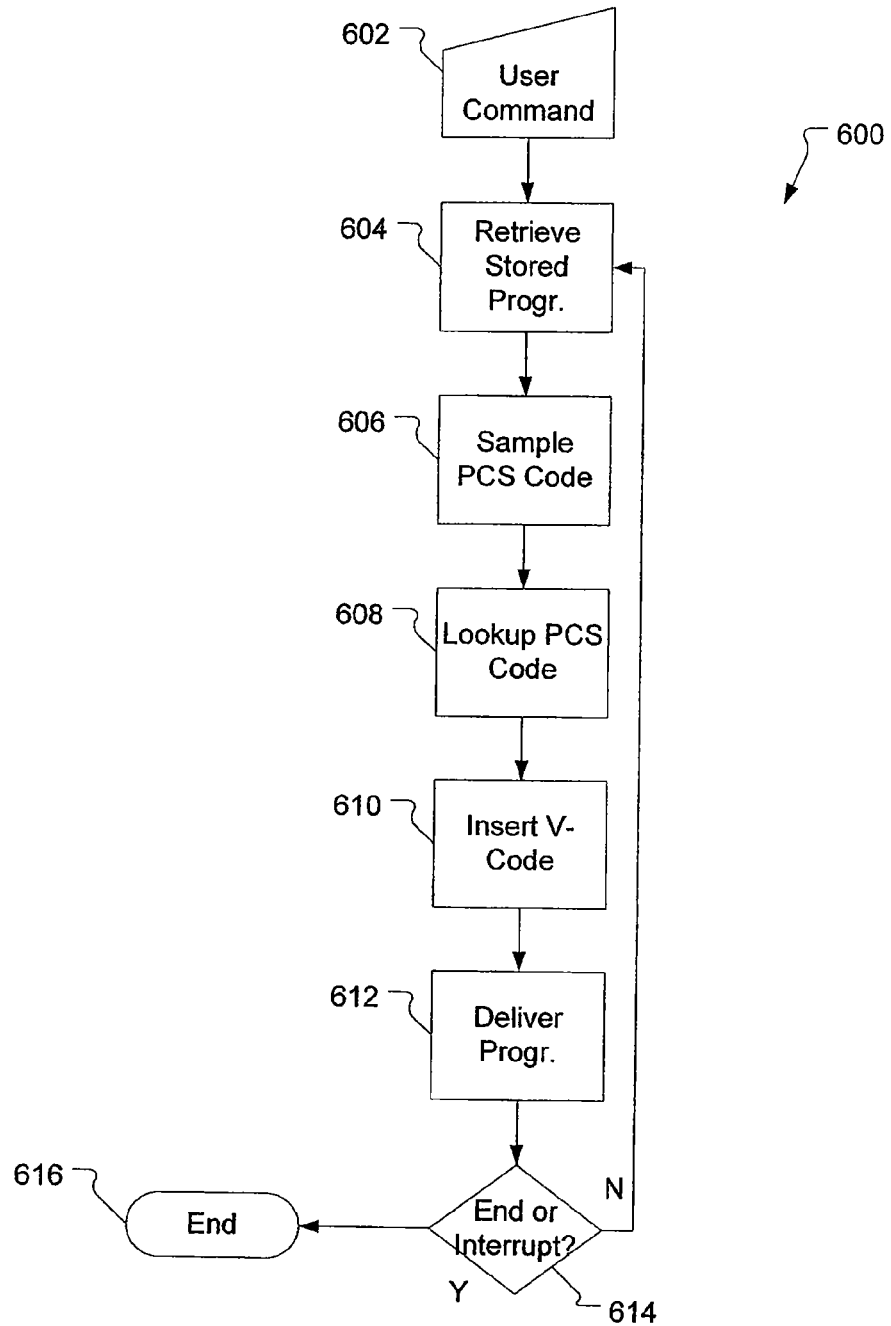
FIG. 6 presents the logical steps of one embodiment of a method of inserting a blocking code into stored television programming by a television converter device.

Turning now to FIG. 6, the logical steps of an embodiment of a general method 600 of inserting a blocking code into television programming stored on and subsequently retrieved by a television converter device based a first code provided by the programming distributor. In the embodiment shown, the first code is a PCS code embedded by a programming distributor at the head end into an EPG which is subsequently stored on the storage device as part of the initial recording of the television programming. The method 600 begins when the television converter device receives a manual input in the user command step 602 to deliver television programming stored on the television converter device.

Upon receiving the user command, a retrieval step 604 retrieves a first portion of the specified stored television programming. After retrieval of the first portion of the television programming, a sampling step 606 samples or otherwise obtains the first code associated with the stored television programming from the storage device.

Next, the first code is compared to a lookup table to determine its corresponding V-code in the lookup step 608. In the embodiment, the PCS provides more classifications than the MPAA rating system. A lookup table, that may or may not be editable by the user, is stored on the television converter device that identifies each PCS code with a specific V-code.

Based on the results of the comparison in the lookup step 608, a V-code will be inserted into the television programming by the insertion step 610. The insertion of the V-code may or may not require the removal of other information contained in the VBI. For example, in another embodiment wherein the first code is embedded in the VBI of the television programming, the first code is replaced by the V-code inserted by the insertion step 610.

After the appropriate V-code is inserted into the television programming by the insertion step 610, the television programming is delivered to the connected TVs by the delivery step 612. Delivery of the television programming to the connected TVs occurs regardless of the V-code inserted or the results of the lookup step 608.

The retrieval step 604, sampling step 606, lookup step 608, insertion step 610 and delivering step 612 represent steps within a continuous data delivery process. In some embodiments, the first code is stored separately from the television programming and the sampling step 606 may be performed at the initial retrieval and not repeated until the scheduled end of the program (as determined from EPG data associated with the specific program that is also recorded and stored with the first code). For embodiments wherein the first code is recorded within the VBI of the television programming, the sampling step 606 may sample the first code contained within each VBI as it is retrieved by the television converter device. Alternatively, the sampling step 606 may only sample some subset of VBIs, e.g. every tenth vertical blanking interval, as the television converter device manufacturer deems appropriate.

In any event, the method 600 continuously repeats the steps so that if the nature of the retrieved television programming were to change, as reflected by a change in the first code, such programming then would be blocked, depending on the blocking level of each connected TV, by the method 600.

The delivery interrupt step 614 illustrates the repeating of the method 600. The delivery interrupt step 614 causes the retrieval step 604, sampling step 606, comparing step 608, insertion step 610 and delivering step 612 to be repeated until the delivery interrupted. The delivery may be interrupted by a user command or some other event that requires the television converter device to cease delivery of the specified television programming. The method 600 ends when the delivery is ceased at termination step 616.

Embodiments of the present invention also allow the user to make his own determination of what PCS classification specific programs should be in. In embodiments wherein the PCS information is stored in the EPG, the user can access and change, via an on-screen menu, the PCS classification of specific programs stored in the EPG. For example, if the user finds The Powerpuff Girls, The Movie particularly offensive, the user can access the parental controls and change the original PCS classification in the EPG of "The Powerpuff Girls, The Movie," whatever it may be, to a classification of extreme violence. Thus, based on the new PCS code of extreme violence, the television converter device would insert a TV-MA V-code upon delivery. Thus, only connected TVs with V-chips set to view TV-MA programming would be able to display "The Powerpuff Girls, The Movie." Note that in the embodiments the user may change to a more restrictive or to a less restrictive classification.

In embodiments wherein the PCS code is embedded with the television programming, the user can, again via an on-screen menu, select a specific program from the EPG (or in alternative embodiments manually input the channel, start time and duration of a specific program) and chose a blocking level for that specific program. This information is stored by the television converter device and, upon delivery of the specific program, the user-selected blocking level is used to determine the appropriate V-code rather than the embedded PCS code.

We claim:
1. A receiver, comprising:
at least one user interface component that receives at least one command to display at least one program on at least one display device; and at least one processing unit, communicably coupled to the at least one user interface component, that:
  reads a first type of blocking code associated with the at least one program;
  converts the first type of blocking code into a second type of blocking code that corresponds to the first type of blocking code based at least on a set of correspondences between each possible blocking code of the first type of blocking code and blocking codes of the second type of blocking code; and
  adds the second type of blocking code into the at least one program.

2. The receiver of claim 1, wherein the second type of blocking code causes the at least one display device to block display of the at least one program.

3. The receiver of claim 1, wherein the second type of blocking code is a V-code.

4. The receiver of claim 1, wherein the first type of blocking code is a rating classification blocking code.

5. The receiver of claim 1, wherein the at least one processing unit adds the second type of blocking code into the at least one program by inserting the second type of blocking code into a vertical blanking interval of the at least one program.

6. The receiver of claim 1, wherein the first type of blocking code is embedded in a vertical blanking interval of the at least one program.

7. The receiver of claim 1, wherein the at least one processing unit transmits the at least one program including the second type of blocking code to the at least one display device.

8. A receiver, comprising:
  at least one selector element that receives at least one program; and
  at least one processing unit, communicably coupled to the at least selector element component, that:
    detects a first type of blocking code associated with the at least one program being received by the at least one selector element;
    converts the received first type of blocking code into at least one corresponding analog content code of a plurality of analog content codes based at least one a set of user modifiable correspondences between each possible blocking code of the first type of blocking codes and at least one of each possible analog content code of the plurality of analog content codes; and
    adds the at least one corresponding analog content code into at least one retransmission of the at the at least one program in analog format;
  wherein the at least one selector element transmits the at least one retransmission of the at least one program in analog format to at least one display device wherein the at least one display device is configured to block display of the at least one program based on the at least one corresponding analog content code.

9. The receiver of claim 8, wherein the at least one corresponding analog content code comprises at least one V-code.

10. The receiver of claim 8, wherein the at least one processing unit adds the at least one corresponding analog content code into the at least one retransmission of the at least one program in analog format by inserting the at least one corresponding analog content code into a vertical blanking interval of the at least one retransmission of the at least one program in analog format.

11. The receiver of claim 8, wherein the first type of blocking code is a rating classification blocking code is a proprietary programming classification system blocking code.

12. The receiver of claim 11 wherein the proprietary programming classification system blocking code is indicative of a rating classification of content of the at least one program.

13. The receiver of claim 8, wherein the first type of blocking code is embedded in a vertical blanking interval of the at least one program.

14. The receiver of claim 8, wherein the processing unit is operable to modify the set of user modifiable correspondences in response to received user input.

15. A receiver, comprising:
  at least one processing unit that:
    determines a first type of blocking code associated with the at least one program to be delivered to at least one display device;
    converts the first type of blocking code into at least one V-code of a plurality of V-codes at least based on user preferences and a set of correspondences between blocking codes of the first type of blocking codes and V-codes of the plurality of V-codes; and
    adds the at least one V-code into the at least one program; and
  at least one selector element, communicably coupled to the at least one processing unit, that transmits the at least one television program including the at least one V-code to the at least one display device.

16. The receiver of claim 15, wherein the processing unit replaces the first type of blocking code with the at least one V-code by adding the at least one V-code into the at least one program.

17. The receiver of claim 15, wherein the at least one processing unit adds the at least one V-code into the at least one program by inserting the at least one V-code into a vertical blanking interval of the at least one program.

18. The receiver of claim 15, wherein the first type of blocking code is a rating classification blocking code is a proprietary programming classification system blocking code.

19. The receiver of claim 18, wherein the proprietary programming classification system blocking code is indicative of a rating classification of content of the at least one program.

20. The receiver of claim 15, wherein the first type of blocking code is embedded in a vertical blanking interval of the at least one program.

* * * * *